United States Patent [19]
Gaiser

[11] Patent Number: 5,287,987
[45] Date of Patent: Feb. 22, 1994

[54] FILAMENT WOUND PRESSURE VESSEL

[75] Inventor: William R. Gaiser, Spring Valley, Ohio

[73] Assignee: Comdyne I, Inc., Pa.

[21] Appl. No.: 937,554

[22] Filed: Aug. 31, 1992

[51] Int. Cl.5 .............................................. B65D 8/08
[52] U.S. Cl. .................................. 220/589; 220/414; 220/453
[58] Field of Search ............... 220/589, 416, 453, 455, 220/590, 588, 414

[56] References Cited

U.S. PATENT DOCUMENTS

| | | |
|---|---|---|
| 3,843,010 | 10/1974 | Morse et al. |
| 3,874,544 | 4/1975 | Harmon |
| 3,949,038 | 4/1976 | McChesney et al. |
| 4,369,894 | 1/1983 | Grover et al. |
| 4,415,717 | 11/1983 | Toga et al. |
| 4,438,858 | 3/1984 | Grover |
| 4,587,074 | 5/1986 | De Loof |
| 4,925,044 | 5/1990 | Hembert |
| 5,004,120 | 4/1991 | Hembert |
| 5,012,950 | 5/1991 | Knappe ............................ 220/589 |
| 5,025,943 | 6/1991 | Forsman .......................... 220/589 |

Primary Examiner—Joseph Man-Fu Moy
Attorney, Agent, or Firm—Biebel & French

[57] ABSTRACT

A light weight filament wound pressure vessel for retaining gases under high pressure is formed with a barrier liner, in which the liner comprises a single layer of biaxially stretched and oriented polyethylene terephthalate (PET) plastic material.

5 Claims, 3 Drawing Sheets

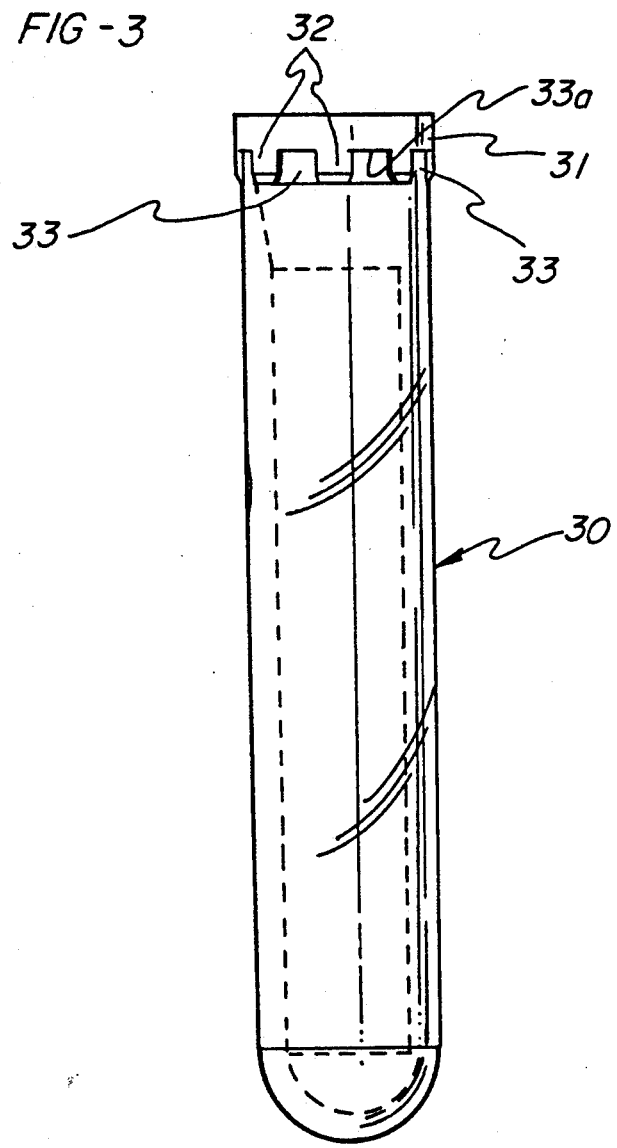

FILAMENT WOUND PRESSURE VESSEL

BACKGROUND OF THE INVENTION

This invention relates to a reinforced pressure vessel, and more particularly to a lined filament wound pressure vessel for containing gases under high pressure.

It is common practice to provide metal lined pressure vessels which are reinforced by an over-wrap of a cured, resin-impregnated, filament material, such as filament glass. Such cured resin impregnated filament pressure vessels are capable of containing high gas pressures at favorable weight to volume ratios. In spite of higher cost and weight, metal has been the material of choice for pressure vessel liners in view of the gas impermeability of the metal, thereby providing acceptably long high pressure storage times.

An example of a metal lined filament wound pressure vessel designed for storing gases under high pressure (up to 10,000 psi) is shown in Morse et al, U.S. Pat. No. 3,843,010 issued Oct. 22, 1974. In that patent, a pressure vessel with a thin metal liner is described as having a distinct advantage over non-metal lined pressure vessels from gas permeability and leakage rate standpoints. However, metal linings are relatively expensive and are prone to failure due to metal fatigue induced by repeated pressurizations and depressurizations.

Liners formed of injection molded, centrifugal cast or blown polyethylene, in the manufacture of an "allcomposite" cylinder or pressure vessel have also been attempted. Such liners have included blown, high density polyethylene with aluminum end bosses. However, the high gas permeability of polyethylene, including HDPE, has required such liners to have walls of substantial thicknesses for very high pressure gas retention, thereby losing the benefit of the lighter density and lower cost of this material compared to a metal liner. The relatively high gas permeability of HDPE has lead to investigations as to additives and surface treatments for further reducing permeation by gas through the liner.

Typical design pressures may exceed 3,000 psi for retaining compressed natural gas, as a fuel for automotive vehicle use. A leakage rate in excess of 0.25 cubic centimeters per hour per liter of capacity is considered to be excessive. Firemen's backpack air bottles represent a further example of the use of a composite wound high pressure vessel which must have a light weight and yet be very strong. They may be pressurized up 4,500 psi.

SUMMARY OF THE INVENTION

This invention relates to a lined composite pressure vessel in which the liner is formed of blown biaxially stretched and oriented polyethylene terephthalate (PET) material. The walls of a PET preform are stretched during for blowing to conform to the geometry of the mold. Stretching results in biaxial orientation of the material and imparts a high level of molecular chain alignment. This results in increased molecular order, high tensile yield strength, high impact strength, and excellent creep resistance. Importantly, it results in superior gas barrier properties permitting a relatively thin barrier or liner walls with very light weight.

The liner is blown into a mold having an internal configuration according to the shape of the liner. from a preform of amorphous PET. The preform is preheated to a temperature just above its glass transition temperature, and then blown under air pressure into the mold cavity according to the final shape of the liner. At the same time, a metallic inlet boss or fitting may be molded in place on the preform neck liner to form the finished neck of the bottle.

A blow-up ratio between the diameter of the preform and the diameter of the liner is chosen so as to provide full and complete biaxial orientation of the material. Also, the thickness of the walls of the preform is chosen so as to provide the desired wall thickness of the finished liner. After blowing the mold is permitted to cool while internal gas pressure is maintained, before opening the mold and removing the liner.

Prior to filament winding, a second metallic boss is applied to the semi-spherical closed end of the liner to provide a support and pivot location for winding. Thereafter filament in the form of glass, carbon fiber or a composite is applied with resin, in a wrapping manner well known in the art to bond the end bosses in place and encapsulate the liner and provide the desired burst resistance to the pressure vessel. During winding, the liner is internally pressurized to provide strength against being crushed or collapsed by the filament tension, as known in the art. After winding, the pressure vessel is oven cured according to conventional processes, to cure the resin component of the winding composite.

The biaxially oriented PET liner is not only highly impermeable to gases, it also has high tensile yield strength and creep resistance. The gas transmission rate of stretched PET, as measured according to ASTM D-1434, for oxygen, provides a transmission rate per 100 square inches of surface area per 24 hour period of 0.4 cubic centimeters, with a wall thickness of 12 mill. Under the same test conditions, the $CO^2$ transmission rate is only 2.0 cubic centimeters.

It is therefore an object of the invention to provide a lightweight, high pressure and high strength pressure vessel for retaining a gas under pressure in which a liner forms a gas barrier, as outlined above, characterized by a liner which is formed of a single thickness or layer of biaxially oriented polyethylene terephthalate material.

A further object of the invention is to provide a gas pressure vessel of the lined filament wound type in which a liner is formed with a single layer or thickness of biaxially stretched polyethylene terephthalate.

A further object of the invention is the provision of a pressure vessel in which an inlet fitting or boss is bonded to a blown liner during the blow molding of the liner.

These and other objects and advantages of the invention will be apparent from the following description, the accompanying drawings and the appended claims.

BRIEF DESCRIPTION OF ACCOMPANYING DRAWINGS

FIG. 3 is an elevational view of a preform from which the pressure vessel liner is formed.

DESCRIPTION OF PREFERRED EMBODIMENT

Figure 1:
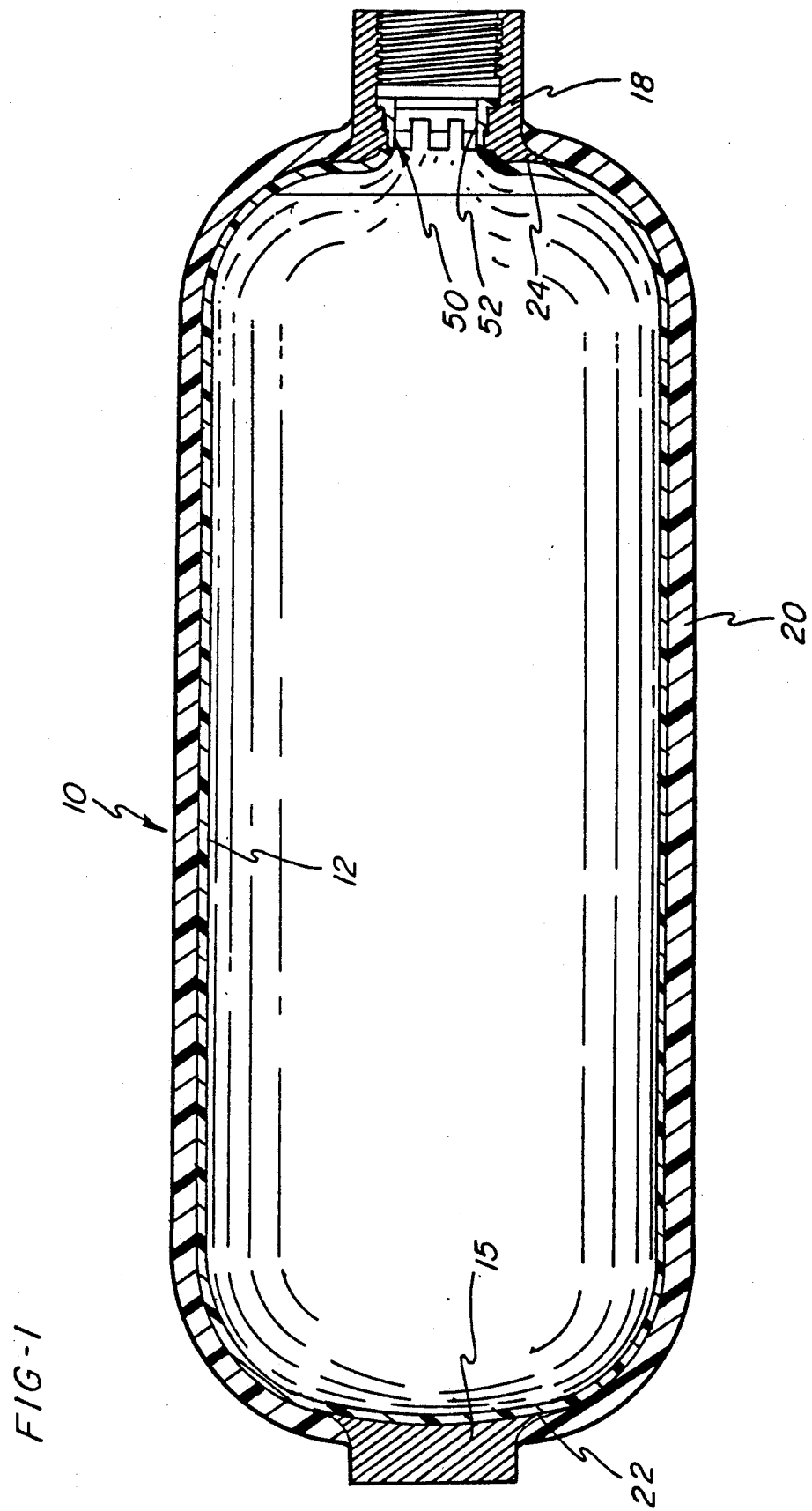
FIG. 1 is a sectional view through a reinforced pressure vessel according to this invention.

Referring to the drawings, which illustrate a preferred embodiment of the invention, a lightweight, high strength composite or filament wound and lined gas pressure vessel is illustrated generally at 10 in FIG. 1. The vessel 10 includes an internal, single thickness, integral gas barrier liner 12, a pair of polar fittings including a base fitting 15 and an inlet fitting 18, on opposite ends, and an outer filament winding 20.

The polar fittings 15 and 18 are provided with annular flanges 22 and 24, respectively, which are curved to conform to the semi-spherical pressure ends of the liner, and which are overwrapped by the filament winding 20 so that the fittings are captured and encapsulated within the respective ends of the bottle 10. While a pressure vessel is shown in the drawings as having a generally cylindrical configuration, it will be understood that other shapes may be made in accordance with the invention, such as for example, spherical.

High strength pressure windings 20, preferably filament windings, are laid on and over the liner 12 and the end fittings 15 and 20, in a manner which is well known and understood in the art. Thus, the filaments themselves may be glass, interspersed, if desired, with "Kevlar" and/or carbon filaments and the helically wound over the liner 12, while a gas pressure is maintained in the liner 12 to prevent it from being crushed by the tension of the windings. Thereafter, the windings and the binding resin are cured, as conventional.

Prior to the filament winding of the pressure vessel 10 according to this invention, the liner 12 is by inserting a preform 30 of PET material, as shown in FIG. 3, into the opening formed in the inlet fitting 18, heating the preform and thereafter blowing the same to conform to the shape of a mold cavity identical to the shape of the preform as illustrated in FIG. 1. With reference to FIG. 3, it will be noted that the neck of the preform 30 is formed with a somewhat enlarged band 31, at the open end, and defining a series of circumferentially spaced, axially-extending protuberances or ribs 32, separated by indentations 33. The ribs 32 extend from a common annular ledge or surface 33a.

Figure 2:
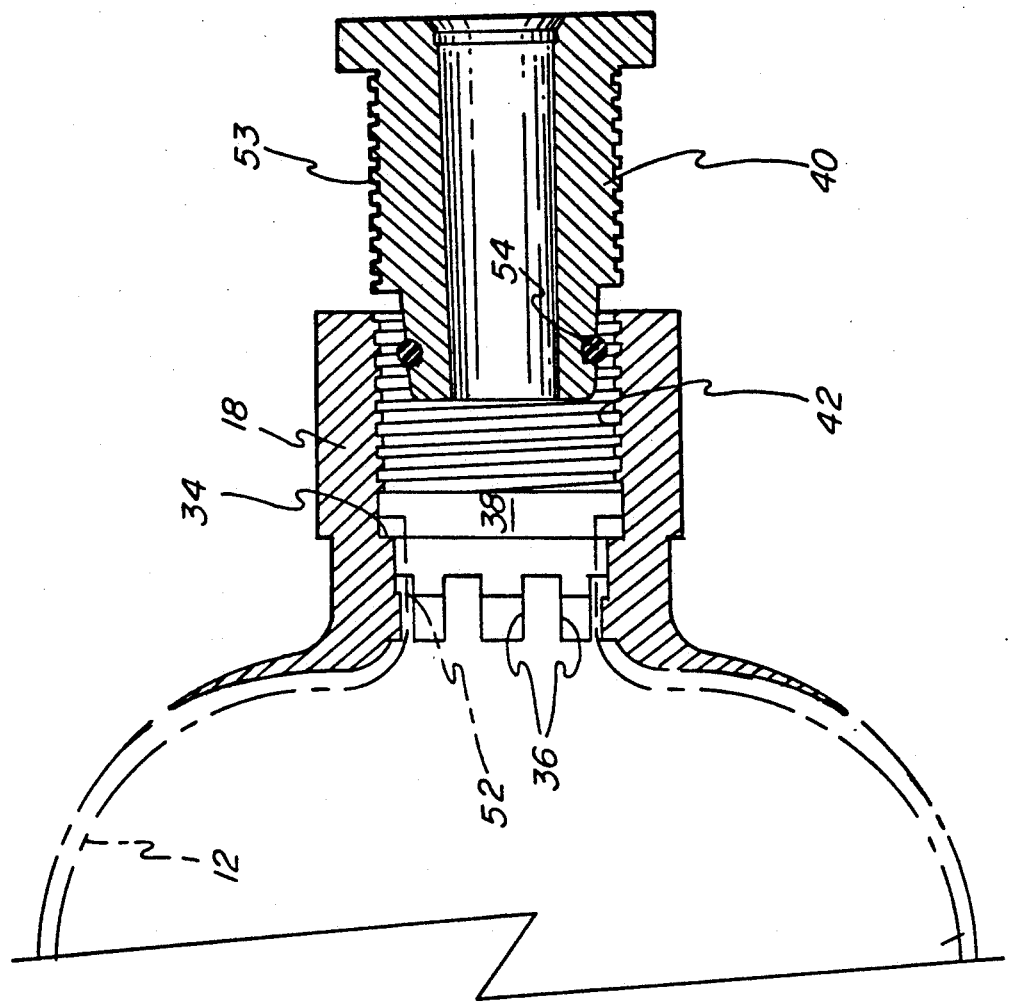
FIG. 2 is an enlarged fragmentary sectional view showing the relationship of an inlet connector and the blown liner prior to winding.

When the preform 30 is inserted into the fitting 18 (FIG. 2), the ledge surface 33a seats on an internal ledge 34 formed in the neck of the fitting 18, while the ribs 32 extend into axially extending grooves 36 proportioned to receive the ribs. In this manner, the preform 30 is firmly locked into position within the fitting 18 prior to molding. During the pressure molding operation, top of the preform, at the band 31 and ribs 32, is also expanded outwardly so as to form a tight mechanical fit with the fitting 18. Also, as shown in FIG. 2, the fitting 18 defines or forms an inlet opening 38 which is internally threaded at 42 for the purpose of receiving a hose connector 40, as shown.

The preform 30 is formed of polyethylene terephthalate (PET). The preform 30 has been conventionally injection molded approximately to the shape as illustrated in FIG. 3, while the final bottle configuration of the liner is as illustrated in FIG. 1. During blow molding, the preform 30 is heated or preheated conventionally, and then blown from the interior through the fitting 18, into a mold cavity, of the exact shape as shown in FIG. 1. The blowing of the preform results in the biaxial stretching of the PET material as it moves axially and outwardly to conform to the mold shape. As noted above under "Summary of the Invention", the blowing of the preform 30 results in the stretching of the walls to conform to the geometry of the finished liner and results in a biaxial orientation which imparts a high level of molecular chain alignment to the PET material.

A typical glass transition temperature $T_9$ is about 160° C., and prior to blowing, the preform 30, for blow molding, is heated to a temperature somewhat above the glass transition temperature. The draw or blow ratio between the preform and the finished liner 12, as illustrated in FIG. 1, is about 3.5:1 to 4.1:1. The melt flow index (ASTM-D-1238) of the PET material is less than 3.

In a specific example, a pressure container having a nominal capacity of two liters (actually 115 cu. in.) had a PET liner formed from a preform 30 which had a weight 40.6 grams. The wall thickness in the cylindrical portion of the blown liner configuration, as shown in FIG. 1, was about 0.010 inch and slightly thicker at the curved pressure bottom and curved pressure top, and forming an axial inlet opening 50 within the fitting 18. The inlet opening 50 is axially aligned with the fitting opening 38 and provides a peripheral sealing surface 52 for receiving an O-ring 54 of the connector 40.

When the connector 40 is threaded into the fitting 18, the O-ring 54 is brought into sealing contact with the generally axial sealing surface of the opening 50 in the neck of the liner 12. In this manner, there is no escape of pressurized gas into the interface space between the neck of the liner 12 and the inside surface of the fitting 18.

In the example previously mentioned, a 2-liter composite lined pressure vessel for fire fighter emergency backpack use was capable of handling a working pressure of 3,600 psi. It weighed approximately 44 ounces, of which only 40.6 grams represented the liner. This may be compared to a prior art glass filament wound pressure vessel, designed for a service pressure of 3,000 psi, and an internal volume of about 4.0 liters with a molded HDPE liner in which the bottle weighed 64.7 pounds, of which 10.2 pounds constituted the liner. A further prior 4.0 liter bottle was wound using high tensile carbon filament and had a weight of 31.5 pounds, of which 10.2 pounds constituted the HDPE liner.

The high impermeability of the stretched PET liner material, combined with its very light weight, high tensile strength, and high creep resistance provides a superior high strength composite pressure vessel. The relatively high cost of the aluminum or metallic liners is eliminated, and good retention of gases under high pressure and long service life are achieved at a savings of weight and cost as compared to conventional HDPE molded liners.

The biaxially stretched, thin liner layer of PET material would be predicted as having excellent gas barrier properties when tested in accordance with procedures set forth in ASTM D-1434 for gas transmission rates, as first described under "Summary of the Invention." To confirm the superior qualities of a liner made according to this invention, a test was made using a specimen of biaxially stretched PET material of a thickness of 0.005 inch. A 667 ml pressure test cylinder was used which could be pressurized, by compressed air, to 3,000 psi. The test specimen had a surface area of 12.7 square inches and was subjected to pressure from the cylinder at 3,000 psi. The cylinder and specimen were trapped under water, and the air bubbles escaping through the test specimen were collected and volume measured.

The initial 3,000 psi pressure at the start of the test dropped to 2,950 psi on the third day and remained at approximately this pressure for thirty (30) days. Sometime between the 33rd and 41st day, the test fixture failed, thereby allowing the retained air to escape, but within a thirty day test term, measurements were taken of the volume of escaped air through the test specimen, as defined.

For a period of thirty days, the total air collected escaping through the test specimen was 14 milliliters or 0.854 cubic inch. This resulted in a permeability rate of 0.06794 cubic inch per square inch of surface area per month. Doubling the thickness from 0.005 to 0.010, the actual approximate thickness provided by 40.6 gram test parison in the example above, would be expected to reduce the gas transmission rate to about one-half of the observed value of the specimen in this test.

One important use of high pressure containment vessels according to this invention is that of transporting compressed natural gas for vehicular fuel. Extrapolating this test data to a 19 inch diameter all composite compressed natural gas cylinder tank having an internal surface area of 4,398 cubic inches (assuming compressed natural gas permeates at the same rate as compressed air in accordance with the above test), such a cylinder first pressurized to 3,600 psi and stored for one year will have only dropped in pressure by 3.0 psi and would have a pressure of 3,597 psi at the end of a year. The total loss of gas would be less than 0.10% of the total initial volume at the end of a year.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a lightweight pressure vessel for retaining a gas under pressure, in which a liner forms a gas barrier for the vessel, and in which said vessel is strengthened by a wound filament as an over-wrap about said liner, the improvement comprising said liner being formed of a single layer bi-axially oriented polyethylene terephthalate material.

2. The pressure vessel of claim 1 in which said liner has a wall thickness which is substantially uniform throughout and about 0.010 inch.

3. The pressure vessel of claim 1 in which said liner is biaxially oriented by blow molding a parison of such polyethylene terephthalate material and stretching such material, and has a generally cylindrical body, a tapered neck at one end thereof, and a curved semi-spherical closed bottom at the other end.

4. The pressure vessel of claim 3 further comprising a metal fitting having an annular skirt and having an axial opening therethrough,
    said metal fitting being positioned such that said annular skirt engages an outside surface of said liner in conforming relation to said liner at said neck,
    a portion of said liner extending axially into said fitting at said opening and having a generally circular inside surface exposed to said opening forming a gas sealing surface accessible by a connector threaded into said fitting.

5. A lightweight, high strength, composite lined gas pressure vessel, comprising:
    a liner formed as a single thickness of biaxially oriented polyethylene terephthalate polymer material,
    said liner having a polar generally hemispherical closed end, a generally cylindrical center section, and a generally semi-spherical inlet end in opposed relation to said closed end,
    an inlet boss pressure molded to said liner inlet end,
    said inlet boss having an annular skirt portion positioned against an outside surface of said liner at said inlet end, an axial end formed in said inlet boss defining an opening, and a portion of said liner integrally extending axially into said opening and defining an inside annular sealing surface for forming a seal with a sealing member carried on a coupler threaded into said inlet fitting opening.

* * * * *